United States Patent
Piewek et al.

(10) Patent No.: US 7,278,303 B2
(45) Date of Patent: Oct. 9, 2007

(54) METHOD FOR DIAGNOSING AN ENGINE CONTROL UNIT AND CORRESPONDING ENGINE CONTROL UNIT

(75) Inventors: Jan Piewek, Wolfsburg (DE); Jens Jeschke, Braunschweig (DE); Andreas Wagner, Magdeburg (DE); Thomas Lang, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 135 days.

(21) Appl. No.: 11/243,782

(22) Filed: Oct. 5, 2005

(65) Prior Publication Data

US 2006/0086176 A1    Apr. 27, 2006

(30) Foreign Application Priority Data

Oct. 5, 2004    (DE)    ...................... 10 2004 048 330

(51) Int. Cl.
*G01M 15/00*    (2006.01)
(52) U.S. Cl. ...................................... 73/119 R; 73/115
(58) Field of Classification Search .................. 73/112, 73/115, 116, 117.2, 117.3, 118.1, 119 R
See application file for complete search history.

(56) References Cited

U.S. PATENT DOCUMENTS

| | | | | |
|---|---|---|---|---|
| 5,554,801 | A | * | 9/1996 | Watanabe ..................... 73/115 |
| 6,276,319 | B2 | * | 8/2001 | Walter et al. ............. 123/90.15 |
| 7,117,725 | B2 | * | 10/2006 | Okubo et al. .................. 73/115 |
| 7,124,020 | B2 | * | 10/2006 | Vermonet et al. ........... 701/114 |
| 2005/0199049 | A1 | * | 9/2005 | Okubo et al. .................. 73/115 |
| 2006/0032291 | A1 | * | 2/2006 | Kashiwase et al. ........ 73/35.06 |
| 2006/0217872 | A1 | * | 9/2006 | Moriya et al. .............. 701/114 |
| 2006/0243030 | A1 | * | 11/2006 | Oe et al. .................... 73/35.09 |

* cited by examiner

*Primary Examiner*—Eric S. McCall
(74) *Attorney, Agent, or Firm*—Baker Botts L.L.P.

(57) ABSTRACT

A method for diagnosing an engine control unit (4) conducts an analysis as to whether the signal values from the cylinder pressure sensors (3) are faulty based on at least one characteristic value which is derived from an evaluation of signal values from the cylinder pressure sensors (3) of the cylinders (2) in a combustion engine (5). In addition to this is described the engine control unit (4) designed to execute the method. Also hereby disclosed is a method which, based on symmetrical aspects, determines a crankshaft angle (phipCylMaxTDC) for a cylinder pressure maximum during push mode operation of the combustion engine (5).

26 Claims, 4 Drawing Sheets

METHOD FOR DIAGNOSING AN ENGINE CONTROL UNIT AND CORRESPONDING ENGINE CONTROL UNIT

CROSS-REFERENCE TO RELATED APPLICATION

This application claims priority from German Patent Application No. 10 2004 048 330.2, which was filed on Oct. 5, 2004, and is incorporated herein by reference in its entirety.

TECHNICAL FIELD

The current invention concerns a method for diagnosing a cylinder pressure based engine management system for a motor vehicle and the corresponding control of the engine.

BACKGROUND

In a motor vehicle according to the prior art, the signal values from the cylinder pressure sensors, which are configured in each cylinder of the combustion engine on the motor vehicle, are fundamental input parameters for the control of the combustion engine. Therefore, faulty signal values from the cylinder pressure sensors can lead to faulty behavior in engine control which, in the worst case, leads to damage of the combustion engine controlled by the engine control unit.

SUMMARY

It is therefore an object of the current invention to prevent faulty engine control behavior due to faulty signal values from the cylinder pressure sensors.

This object can be achieved by a method for diagnosing an engine control unit for a motor vehicle, comprising the steps of receiving signal values from cylinder pressure sensors of cylinders in a combustion engine; deriving at least one characteristic value from an evaluation of said signal values, and analyzing said characteristic value to determine whether the signal values of the cylinder pressure sensors are faulty.

When a maximal cylinder pressure gradient of each cylinder lies below a threshold value, the analysis may result in that the signal values from all of the cylinder pressure sensors are faulty. The threshold value may lie within a range from 0.4 bar/° CA to 0.6 bar/° CA. When the combustion engine is operated in a push mode and data are acquired for a cylinder indicating that the absolute difference between a first crankshaft angle for a maximal cylinder pressure, which is determined by interpolation of cylinder pressure values, and a second crankshaft angle for the maximal cylinder pressure is greater than the crankshaft angle threshold value, the analysis may yield the finding that the signal values of the cylinder pressure sensor of the cylinder are faulty, whereby the first crankshaft angle is determined in that from at least three cylinder pressure-crankshaft angle-variate pairs, which lie around the maximal cylinder pressure, a parabola is constructed and from said parabola, the vertex is determined, whereby the second crankshaft angle is determined by a special method in which equally great cylinder pressure values in a compression phase and in an expansion phase are acquired by symmetrical aspects. The crankshaft angle threshold value may lie between 0.3° CA and 0.5° CA. The special method may determine a cylinder pressure-crankshaft angle-variate pair in a compression phase of the cylinder and, for a cylinder pressure of this cylinder pressure-crankshaft angle-variate pair, may determine, from a set of cylinder pressure-crankshaft angle-variate pairs in a subsequent expansion phase of the cylinder, a cylinder pressure-crankshaft angle-variate pair, in which the appertaining cylinder pressure lies at least below the cylinder pressure, whereby the special method, in addition to the cylinder pressure-crankshaft angle-variate pair in the expansion phase determined in this manner, determines the cylinder pressure-crankshaft angle-variate pair which temporally lies before the latter, wherein by interpolation of the two cylinder pressure-crankshaft angle-variate pairs in the expansion phase that were determined in this manner, the special method determines a crankshaft angle for which there is a cylinder pressure in the expansion phase, whereby with this crankshaft angle and with a crankshaft angle appertaining to the cylinder pressure-crankshaft angle-variate pair in the compression phase, the second crankshaft angle is determined.

A special method may determine the second crankshaft angle phipCylMaxTDC with the following formula:

$$phiCylMaxTDC = \frac{philE1 + \frac{pCylC - pCylE1}{pCylE2 - pCylE1} \times (phiE2 - phiE1) + phiC}{2}$$

with
phipCylMaxTDC second crankshaft angle,
pCylC cylinder pressure of a selected variate pair (pCylC/phiC) under compression,
pCylE1 cylinder pressure of a variate pair (pCylE1/phiE1) under expansion, whose cylinder pressure lies at least below the cylinder pressure pCylC
pCylE2 cylinder pressure of a variate pair (pCylE2/phiE2) under expansion, which temporally lies directly before the variate pair (pCylE1/phiE1)
PhiC crankshaft angle of the variate pair (pCylC/phiC),
PhiE1 crankshaft angle of the variate pair (pCylE1/phiE1), and
PhiE2 crankshaft angle of the variate pair (pCylE2/phiE2).

The special method may determine a predefined number of cylinder pressure-crankshaft angle-variate pairs in the compression phase, whereby the special method determines for each of these cylinder pressure-crankshaft angle-variate pairs respectively one additional second crankshaft angle and determines the second crankshaft angle from a mean value of the additional second crankshaft angles determined in this manner. The cylinder pressure-crankshaft angle-variate pair or the cylinder pressure-crankshaft angle-variate pairs in the compression phase respectively may exhibit a crankshaft angle which lies at least 5° CA before the top dead center. The set of cylinder pressure-crankshaft angle-variate pairs in the expansion phase respectively may exhibit a crankshaft angle which lies within a range from 5° CA to 150° CA after the top dead center.

When the offset correction value of a cylinder, with which the signal values of the cylinder pressure sensor are corrected to an absolute pressure level, changes by more than one pressure threshold value between two consecutive firing cycles, the analysis may yield the finding that the drift in the signal values of the cylinder pressure sensor is too great. The pressure threshold value may then range from between 0.7 bar and 0.9 bar. When, during normal operation of the combustion engine, the difference between the theoretical maximal pressure in a compression phase, which is determined by the intake pipe pressure, the polytropic curve exponent κ and the compression ratio, and the maximal cylinder pressure, measured by the cylinder pressure sensor, is less than the pressure threshold value, the analysis may yield the finding that the cylinder pressure sensor is incorrectly calibrated or that the compression ratio is incorrect. When the combustion engine is operated in push mode and data are acquired indicating that the difference between the maximal cylinder pressure, measured by the cylinder pressure sensor, and the theoretical maximal pressure in a compression phase, which is determined by the intake pipe pressure, the polytropic curve exponent κ and the compression ratio, is greater than the pressure threshold value, the analysis may yield the finding that the cylinder pressure sensor is incorrectly calibrated or that the compression ratio is incorrectly specified. The theoretical maximal pressure in the compression phase can be determined by the multiplication of the intake pipe pressure by the compression ratio potentiated by the polytropic curve exponent κ. When raw signal values from the cylinder pressure sensor exceed or fall short of predefined digitization thresholds, the analysis may yield the finding that the signal values from the cylinder pressure sensor are faulty. When the combustion engine is running at idle and no gear is engaged and no power loads are being exerted on the combustion engine and data are acquired indicating that the difference between an actual indicated mean pressure and a loss mean pressure is greater than the mean pressure threshold value, the analysis may yield the finding that a faulty effective moment of couple is determined. The mean pressure threshold value may then lie between 0.4 bar and 0.6 bar.

When the combustion engine is operated in push mode and is running at a specific speed and data are acquired indicating that the mean pressure is greater than a mean pressure threshold value, the analysis may yield the finding that the top dead center is incorrectly specified and/or that the cylinder pressure sensor is not calibrated properly and/or that the cylinder pressure sensor is not working in a linear mode and/or that the cylinder pressure sensor is not suited to the cylinder to which it is assigned. The specified speed for a Diesel engine may then lie within a range of 1,500 to 2,500 revolutions per minute. When the combustion engine is in a phase of steady state torque demand and data are acquired indicating that the standard deviation of an indicated mean pressure is greater than the mean pressure threshold value, the analysis may yield the finding that the control on the cylinder is unstable and/or that the evaluation of the cylinder pressure sensor is unstable. The mean pressure threshold value may then lie within a range between 0.6 bar and 0.8 bar.

When the combustion engine is in a phase of steady state torque demand and data are acquired indicating that a standard deviation in combustion positions is greater than the crankshaft angle threshold value, the analysis may yield the finding that the control on the cylinder is unstable and/or that the evaluation of the cylinder pressure sensor is unstable. The crankshaft angle threshold value may then lie within a range from 0.6° CA to 0.8° CA.

When the combustion engine is operated in push mode and data are acquired for one of the cylinders indicating that the crankshaft angle for a maximal cylinder pressure does not lie within a crankshaft angle range that is one loss angle before the top dead center, the analysis yields the finding that the signal values from the cylinder pressure sensor are faulty. The loss angle can be dependent on the speed and is determined in advance in that the crankshaft angle for the maximal cylinder pressure is acquired for all speeds during push mode when the combustion engine is operatively warmed up, whereby the combustion engine is set in advance in such a manner that at 2,000 revolutions per minute, the crankshaft angle for the maximal cylinder pressure at 0.7° CA lies before the top dead center. The crankshaft angle range may begin 1° CA before the loss angle and end 1° CA after the loss angle.

The object can also be achieved by an engine control unit for a combustion engine, wherein the engine control unit is designed in such a manner that it derives at least one characteristic value from an evaluation of signal values from the cylinder pressure sensors of cylinders in a combustion engine and analyzes said characteristic value in order to establish whether the signal values from the cylinder pressure sensors are faulty. The engine control unit may receive signal values from cylinder pressure sensors of cylinders in a combustion engine.

In the framework of the current invention, a method for diagnosing a cylinder pressure based engine management system is provided for a combustion engine. Characteristic values are hereby determined based on the signal values from the cylinder pressure sensors which are configured in each cylinder of the combustion engine. These characteristic values are analyzed so that a decision can be made as to whether the signal values are faulty. The combustion engine is then controlled by the engine management system based on this analysis.

In that the signal values from the cylinder pressure sensors are analyzed for faulty signal values with the aid of the characteristic values, faulty signal values can be determined early on so that the engine management system is in a position to react appropriately in a timely manner.

In the method, when the combustion engine is being operated during a push mode, the absolute difference can be determined between a first crankshaft angle for the maximal cylinder pressure and a second crankshaft angle for the maximal cylinder pressure, whereby the first and the second crankshaft angles can be determined by means of various methods that shall be elaborated in the following. If this absolute difference is greater than the crankshaft angle threshold value, which specifically lies between 0.3° CA (crankshaft angle) and 0.5° CA, then the signal values of the corresponding cylinder pressure sensor are faulty since the cylinder pressure sensor is displaying an error in symmetry.

For the following data on absolute crankshaft angles, the ignition TDC (top dead center) is assigned to the absolute crankshaft angle 0° CA. All angles before this TDC are prefixed by a negative sign and all angles after this TDC are prefixed by a positive sign.

For determining the first crankshaft angle of the maximal cylinder pressure, a search is conducted for a cylinder pressure-crankshaft angle-pair of variates pCyl2/phi2 (hereby, pCyl2 is the cylinder pressure and phi2 is the crankshaft angle of the pair of variates) with a maximal cylinder pressure pCyl2 from among the set of measured cylinder pressure-crankshaft angle-pairs of variates from −20° CA to 80° CA. The angle position or the crankshaft angle of the maximal signal value is designated as phi2. In addition to this, a cylinder pressure-crankshaft angle-pair of variates pCyl1/phi1 is determined which temporally lies directly before the cylinder pressure-crankshaft angle-pair of variates pCyl2/phi2 of the maximal cylinder pressure. Determined in exactly the same manner is yet another cylinder pressure-crankshaft angle-pair of variates pCyl3/phi3 which temporally lies directly after the cylinder pressure-crankshaft angle-pair of variates pCyl2/phi2. Now a parabola is constructed for these three cylinder pressure-crankshaft angle-pairs of variates which provides the cylinder pressure over the crankshaft angle. With this, the first crankshaft angle phipCylMax, which occurs at the parabolic maximum that also corresponds to the maximal cylinder pressure, can be calculated as follows, whereby the applicable prerequisite is that the underlying cylinder pressure-crankshaft angle-pairs of variates were each measured at a respective interval of 1° CA:

$$phipCylMax = phi2 - \frac{pCyl1 - pCyl3}{2*(2*pCyl2 - pCyl1 - pCyl3)} \quad (1)$$

For determining the second crankshaft angle, one sets out from the premise that, during push mode operating conditions, the cylinder pressure runs symmetrically in terms of the second crankshaft angle for the maximal cylinder pressure. With this, the middle of an angle position with equally great pressure values from compression and expansion corresponds exactly to the second crankshaft angle.

If one calculates the mean value from the mean positions of several pressure variate pairs which lie within a range of high pressure changes, one will obtain a stable value for the second crankshaft angle for the maximal cylinder pressure.

According to the method of the invention, when the maximal cylinder pressure gradient lies below a threshold value for each cylinder, it can be inferred from this that the signal values from all of the cylinder pressure sensors are faulty.

Thereby, the maximal cylinder pressure gradient is determined in that that within a crankshaft range of between −80° CA to 30° CA, the absolute differences of all of the consecutive signal values are determined and from this set, the maximal difference is determined which corresponds to the maximal cylinder pressure gradient. The applicable prerequisite for this is that the signal values are to be sensed at synchronous angles.

More specifically, the analysis in accordance with the invention yields the finding that the drift in the signal values of the cylinder pressure sensor is too great when the offset correction value for the corresponding cylinder between two consecutive firing cycles changes by more than one pressure threshold value. Thereby, the offset correction value serves to carry out a thermodynamic correction of the signal values measured by a relative measurement of the cylinder pressure sensor so that the signal values that are corrected in this manner all relate to the absolute pressure level. The offset correction value pCylOffs is calculated as follows, whereby the condition is required that the polytropic curve exponent □ be constant for the compression of air at a crankshaft angle range from $\phi_i$ to $\phi_k$:

$$pCylOffs = \frac{p(\varphi_k) - p(\varphi_i)}{\left[\frac{V(\varphi_i)}{V(\varphi_k)}\right]^K - 1} - p(\varphi_i) \quad (2)$$

with:
$\phi_i$, $\phi_k$ Crankshaft angle position
p ($\phi$) Cylinder pressure at the corresponding crankshaft angle
V ($\phi$) Engine displacement at the corresponding crankshaft angle When, during normal operation (operation with combustion) of the combustion engine, the difference between the theoretical maximal pressure in a compression phase and the maximal cylinder pressure measured by the cylinder pressure sensor is less than the pressure threshold value, the analysis in accordance with the invention can yield a finding that the cylinder pressure sensor is incorrectly calibrated or that the compression ratio is incorrect.

Similarly, the analysis in accordance with the invention can yield a finding that the cylinder pressure sensor is incorrectly calibrated or that the compression ratio is incorrect when the combustion engine is operated in a push mode and the difference between the measured maximal cylinder pressure and the theoretical maximal cylinder pressure in a compression phase is greater than the pressure threshold value.

Thereby, the theoretical maximal cylinder pressure pCylMaxtheor is specifically determined as follows:

$$pCylMaxtheor = P_{intake\ pipe} * \epsilon^\kappa \quad (3)$$

with
$P_{intake\ pipe}$ Intake pipe pressure
$\epsilon$ Compression ratio
$\kappa$ Polytropic curve exponent With the digitization of raw signal values from the cylinder pressure sensor, the method in accordance with the invention can recognize that the signal values or the raw signal values from the cylinder pressure sensor are faulty when the raw signal values exceed or fall short of predefined digitization thresholds.

When the combustion engine is running at idle and no gear is engaged and no power loads are being exerted on the combustion engine, then the difference between an actual indicated mean pressure and a loss mean pressure should be less than the mean pressure threshold value. Otherwise, the analysis in accordance with the invention specifically yields the determination of a faulty effective moment of couple. The reason for this is based on the fact that during idling, the combustion engine does not generate any effective moment of couple or any effective mean pressure when the clutch is open. This is the reason why the actual indicated mean pressure and the loss mean pressure must be quantitatively equal for a loss mean pressure model to work correctly.

Thereby, it must generally be taken into consideration that the moments of couple and the mean pressure values relate as being proportional to one another.

When the combustion engine is operated without injection or in a push mode and is running at a specific speed, which specifically lies between 1,500 and 2,500 revolutions per minute, and an indicated mean pressure is detected that lies above the mean pressure threshold value, the analysis in accordance with the invention can yield the following finding:
the top dead center is incorrectly specified
the cylinder pressure sensor is incorrectly calibrated
the cylinder pressure sensor is not working in a linear mode
the cylinder pressure sensor is not suited to the cylinder.

When the combustion engine is in a phase of steady state torque demand and the standard deviation or variance of the indicated mean pressure is greater than the mean pressure threshold value, which specifically lies within a range between 0.6 bar and 0.8 bar, then the analysis in accordance with the invention can yield a finding that the control on the cylinder or the evaluation of the cylinder pressure sensor is unstable.

Similarly, the analysis in accordance with the invention can yield a finding that the control of the cylinder or the evaluation of the cylinder pressure sensor is unstable when the combustion engine is in a phase of steady state torque demand and the standard deviation or variance in combustion positions is greater than the threshold value which specifically lies within a range between 0.6° CA and 0.8° CA.

Furthermore, when the combustion engine is operating in a push mode, the crankshaft angle of the maximal cylinder pressure should lie within a crank angle range which is defined by two speed dependent characteristic lines or by an upper and a lower tolerance threshold which more specifically deviates by ±1° CA from the loss angle dependent on the ideal speed. Otherwise, the analysis in accordance with the invention can yield the finding that the signal values of the cylinder pressure sensor are faulty. Thereby, the loss angle dependent on the ideal speed is defined based on the measurement at which the position of the maximal cylinder pressure (peak pressure) is recorded for all speeds during push mode. Hereby, the set value for the crankshaft angle for a Diesel engine, for example, lies at 2,000 revolutions per minute at −0.7° CA.

In the context of the present invention, an engine control unit is also provided for a combustion engine whereby according to the invention, the engine control unit is designed to implement one of the previously described methods.

The present invention is specifically suited for diagnosing of an engine control unit in a motor vehicle. However, it is not limited to this preferred case of application, but rather it can also be applied, for example, to diagnose an engine control unit for an aircraft or a ship.

BRIEF DESCRIPTION OF THE DRAWINGS

Two focal points of the invention and one exemplary form of embodiment shall be more closely detailed in the following based on the appended drawing.

DETAILED DESCRIPTION

Figure 1:
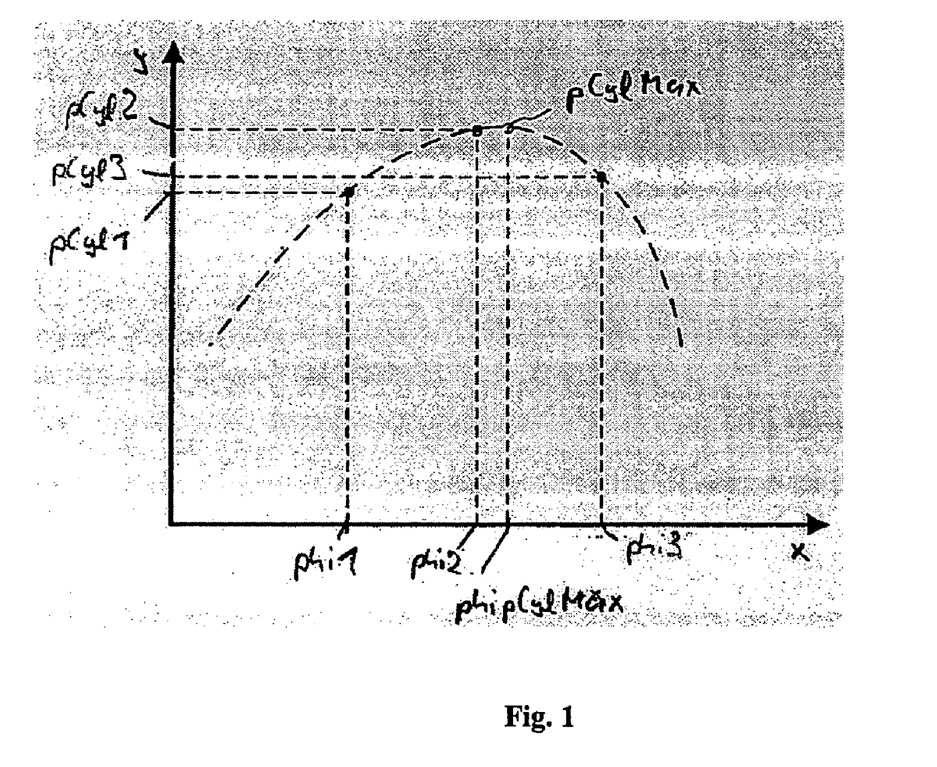
FIG. 1 hereby represents an example of a determination of a crankshaft angle for a cylinder pressure maximum whereby the curve summit is determined from the interpolated parabola.

With the aid of FIG. 1, a method is exemplarily explained for the determination of a crankshaft angle at which a cylinder pressure maximum occurs and which operates by means of a parabola which is calculated from three cylinder pressure-crankshaft angle-pairs of variates. In FIG. 1, the crankshaft angle is represented on the X-axis and the cylinder pressure is represented on the Y-axis. In the case of the method, a cylinder pressure-crankshaft angle-variate pair is determined within a range from −20° CA (20° on the crankshaft before the top dead center of combustion) to 80° CA e.g., per 1° CA (for each degree of the crankshaft) and the first to be determined is the cylinder pressure-crankshaft angle-variate pair (pCyl2/phi2), for which the cylinder pressure pCyl2 is maximal. In case there are two pairs of variates each of whose respective appertaining cylinder pressure is maximal, then the one to be selected will be the one with the lesser crankshaft angle (which lies further to the left in FIG. 1). In addition to this, a cylinder pressure-crankshaft angle-variate pair (pCyl1/phi1) is determined which temporally lies directly before the maximal cylinder pressure-crankshaft angle-variate pair (pCyl2/phi2), and a cylinder pressure-crankshaft angle-variate pair (pCyl3/phi3) is determined which temporally lies directly after the maximal cylinder pressure-crankshaft angle-variate pair (pCyl2/phi2). After this, a parabola is constructed by means of these three cylinder pressure-crankshaft angle-variate pairs, said parabola running through these three cylinder pressure-crankshaft angle-variate pairs. By definition, the curve summit of this parabola hereby corresponds to a cylinder pressure-crankshaft angle-variate pair which exhibits the cylinder pressure maximum pCylMax and therefore provides the wanted crankshaft angle phipCylMax. In accordance with the invention, this desired crankshaft angle value can also be determined by equation (1).

Figure 2:
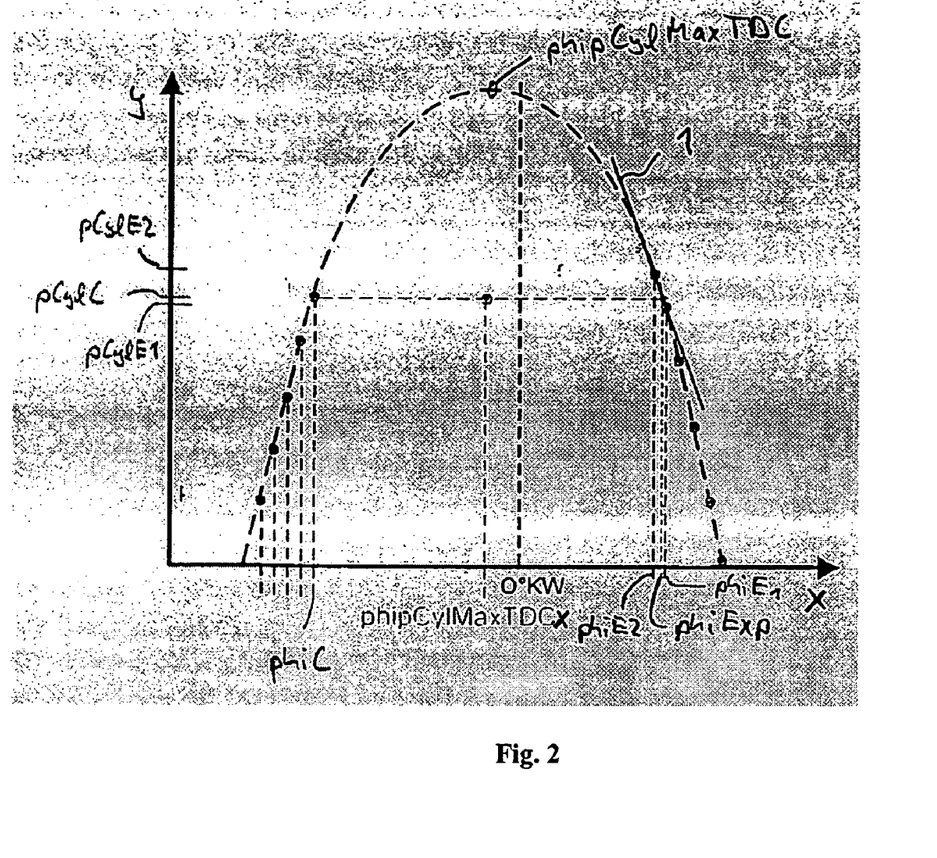
FIG. 2 represents an example for determining the crank angle of the cylinder pressure maximum by means of symmetrical aspects.

With the aid of FIG. 2, a special method is exemplified which, according to the invention, determines a crankshaft angle phipCylMaxTDC for the cylinder pressure maximum by means of symmetrical aspects during push mode operating conditions of the combustion engine. To this end, one sets out from the premise that during push mode operating conditions, the cylinder pressure runs symmetrically in terms of the cylinder pressure maximum. That is to say, the position of the cylinder pressure maximum or of the crank angle corresponds exactly to the middle of a position of equally great cylinder pressure values from the compression phase and from the expansion phase. If corresponding mean positions are formed based on several cylinder pressure-crankshaft angle-variate pairs which lie within a range of high pressure changes, whereby a mean value is calculated from these mean positions, then this mean value provides a stable value for the desired crankshaft angle phipCylMaxTDC.

For the special method example represented in FIG. 2; there is a cylinder pressure-crankshaft angle-variate pair for each 1° CA. Based on this, the special method first determines a cylinder pressure-crankshaft angle-variate pair pCylC/phiC in the compression phase of the cylinder. After this and for the cylinder pressure of this cylinder pressure-crankshaft angle-variate pair, a first cylinder pressure-crankshaft angle-variate pair pCylE1/phiE1 in the expansion phase is determined from a set of cylinder pressure-crankshaft angle-variate pairs arranged in the subsequent expansion phase of the cylinder, said first variate pair having an appertaining cylinder pressure pCylE1 with the smallest of differences below the cylinder pressure pCylC. After this, the special method determines a second cylinder pressure-crankshaft angle-variate pair pCylE2/phiE2 in the expansion phase which temporally lies directly before the first cylinder pressure-crankshaft angle-variate pair pCylE1/phiE1. The second cylinder pressure-crankshaft angle-variate pair pCylE2/phi2 hereby exhibits in the expansion phase a cylinder pressure pCylE2. By means of a straight line 1, represented in FIG. 2, running through the first and the second cylinder pressure-crankshaft angle-variate pairs in the expansion phase, a third cylinder pressure-crankshaft angle-variate pair pCylC/phiExp in the expansion phase can be determined for which the cylinder pressure is equal to the cylinder pressure pCylC. With this, one can determine the appertaining crankshaft angle with equation (4):

$$phiExp = phiE1 + \frac{pCylC - pCylE1}{pCylE2 - PCylE1} \times (phiE2 - phiE1) \quad (4)$$

Since it is assumed in the case of the example represented in FIG. 2 that two adjacent cylinder pressure-crankshaft angle-variate pairs lie 1° CA apart from one another, the last parenthetical expression (phiE2-phiE1) is equal to 1 in equation (4) and can therefore be dropped.

A crankshaft angle phipCylMaxTDCx, for which there is a cylinder pressure maximum based on the three cylinder pressure-crankshaft angle-variate pairs described above, is then equal to half of the sum of the crankshaft angle phiExp, determined by interpolation, and of the crankshaft angle phiC of the cylinder pressure-crankshaft angle-variate pair pCylC/phiC in the compression phase. This can also be expressed by the following equation (5):

$$phiCylMaxTDC_x = \frac{phiE1 + \frac{pCylC - pCylE1}{pCylE2 - pCylE1} \times (phiE2 - phiE1) + phiC}{2} \quad (5)$$

For the same reasons as in the case of equation (4), the parenthetical expression (phiE2-phiE1) can be dropped in equation (5).

The special method indeed determines the crankshaft angle phipCylMaxTDC for the cylinder pressure maximum not only based on a cylinder pressure-crankshaft angle-variate pair in the compression phase, but rather based on several cylinder pressure-crankshaft angle-variate pairs in the compression phase respectively determines an additional crankshaft angle phipCylMaxTDCx for the cylinder pressure maximum for each one of these variate pairs. The crankshaft angle phipCylMaxTDC for the cylinder pressure maximum is then a mean value for these additional crankshaft angles phipCylMaxTDCx for the cylinder pressure maximum. With this, the special method in accordance with the invention determines a stable value for the crankshaft angle phipCylMaxTDC of the cylinder pressure maximum during operating push mode conditions of the combustion engine.

This can be expressed by the following equation (6):

$$phipCylMaxTDC = \frac{1}{N} \times \sum_{i=1}^{N} \frac{phiExp_i + phiC_i}{2} \quad (6)$$

with:

phipCylMaxTDC Crankshaft angle of the cylinder pressure maximum

N Number of variate pairs in the compression phase for which phipCylMaxTDCx is being determined $phiC_i$ Crankshaft angle of the i-th variate pair in the compression phase $phiExp_i$ extrapolated crankshaft angle which corresponds to a cylinder pressure of the i-th variate pair in the compression phase.

The determination of the mean value is only suggested in FIG. 2 in that the crankshaft angle phipCylMaxTDC of the maximal cylinder pressure is drawn in as being offset slightly to the right of the crankshaft angle phipCylMaxTDCx.

Let it be expressly pointed out that the special method can also be applied independently of the method for the diagnosis of the engine control unit. With the special method, the crankshaft angle of the cylinder pressure maximum can be determined which is a valuable input parameter, for example, for the engine control unit of the combustion engine in order to control the combustion engine.

Figure 3:
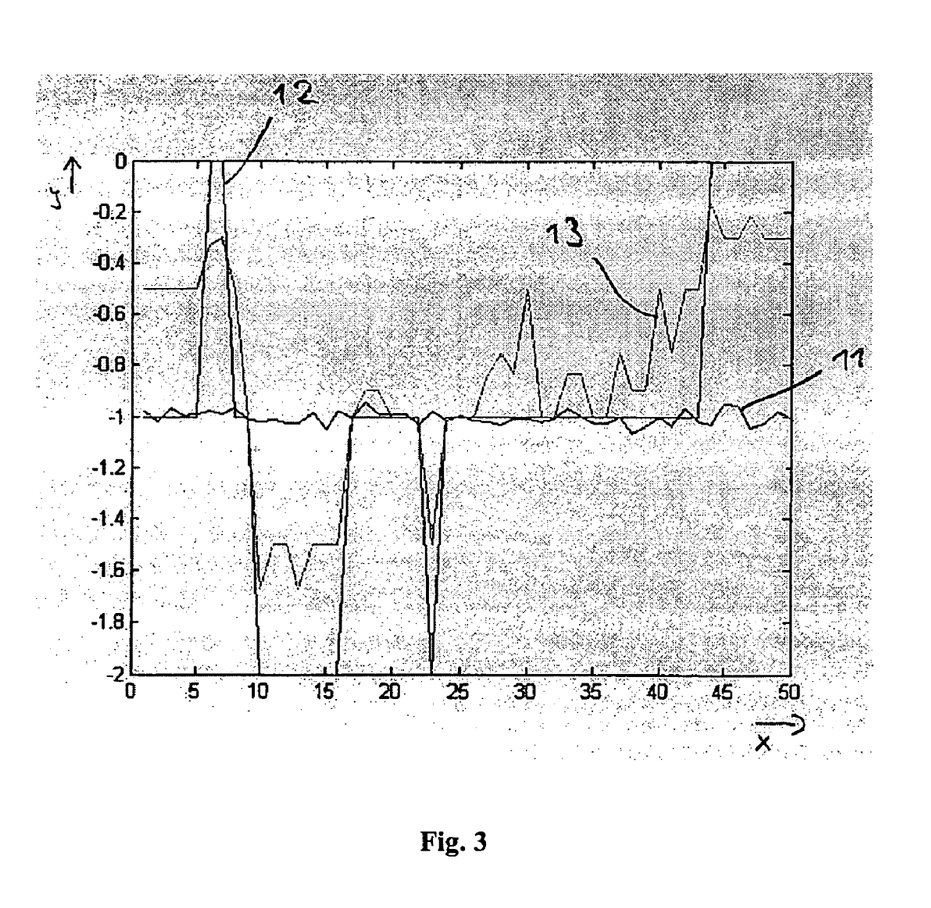
FIG. 3 represents exemplary graphic courses for three methods used to determine a crankshaft angle for the cylinder pressure maximum.

The merit of the special method can be deduced from FIG. 3. In FIG. 3, for 50 consecutive firing cycles (X-axis) are traced the appertaining crankshaft angles (Y-axis) for the cylinder pressure maximum, whereby the crankshaft angle is represented in ° CA after the top dead center of combustion. The following three methods were thereby compared:

the special method, refer to curve 11 a method which determines the highest cylinder pressure variate pair from a set of cylinder pressure-crankshaft angle-variate pairs; refer to curve 12 the method operating with the parabola; refer to curve 13.

One recognizes that curve 11 runs the smoothest and therefore provides the most stable value for the crank angle of the cylinder pressure maximum. This can also be ascertained from the standard deviation which was calculated for the measured values represented in FIG. 3 for each of the individual methods:

Curve 11: standard deviation=0.027° CA

Curve 12: standard deviation=0.589° CA

Curve 13: standard deviation=0.412° CA

Figure 4:
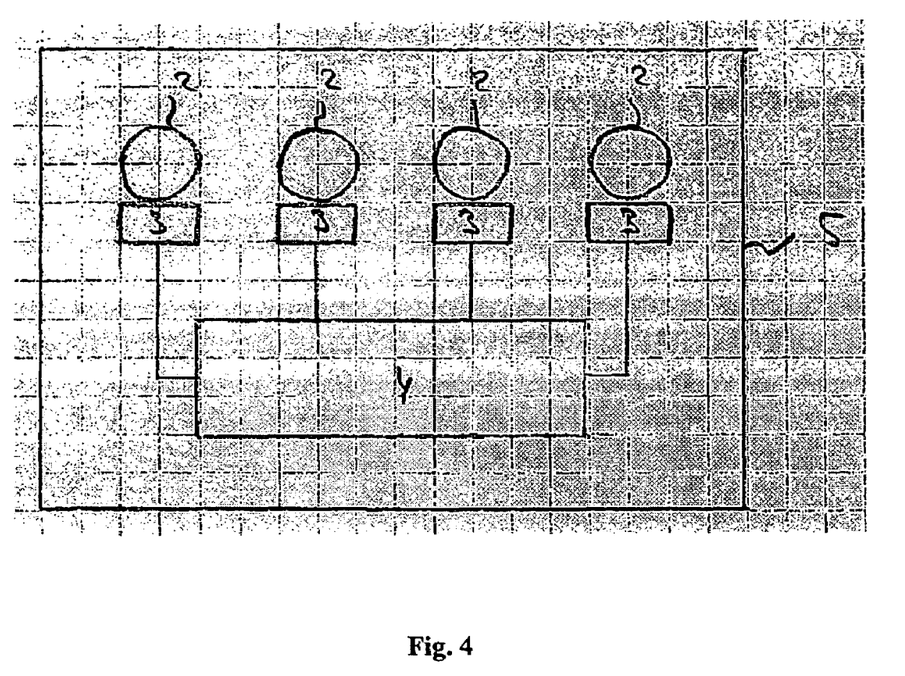
FIG. 4 represents an engine control unit system in accordance with the invention.

In FIG. 4 is represented an engine control unit 4 for controlling a combustion engine 5. The combustion engine 5 is hereby comprised of four cylinders 2, whereby the cylinder pressure of each cylinder 2 is recorded by a cylinder pressure sensor 3 assigned to each respective cylinder 2. The four cylinder pressure sensors 3 deliver their acquired signal values to the engine control unit 4, which, based on these signal values checks whether the cylinder pressure sensors 3 are working properly. The engine control unit 4 hereby responds in accordance with the corresponding finding of this examination.

| Reference Designation List | |
|---|---|
| 1 | Straight line |
| 2 | Cylinder |
| 3 | Cylinder pressure sensor |
| 4 | Engine control unit |
| 5 | Combustion engine |
| 11-13 | Course of the curves |
| dpCylMax | Maximal cylinder pressure gradient |
| dpCylMaxLim | Pressure threshold value |
| dpCylMaxMin | Threshold value |
| dpCylOffsMaxLim | Pressure threshold value |
| pCyl1-pCyl3 | Cylinder pressure |
| pCylC | Cylinder pressure in the compression phase |
| pCylE1, pCylE2 | Cylinder pressure in the expansion phase |
| pCylMax | Maximal cylinder pressure |
| pCylMaxtheor | Theoretical maximal cylinder pressure |
| pCylOffs | Offset correction value |
| phi1-phi3 | Crankshaft angles |
| phiC | Crankshaft angle during compression |
| phipCylMax | Crankshaft angle of a maximal cylinder pressure |
| phipCylMaxTDCx | Crankshaft angle of a maximal cylinder pressure |
| phipCylMaxTDC | Mean value of several phipCylMaxTDCx's |
| phiE1, phiE2 | Crankshaft angles during expansion |
| phiExp | Crankshaft angle during expansion |

-continued

Reference Designation List

| | |
|---|---|
| phiQvbStdDev | Standard deviation in combustion positions |
| phiQvbStdDevLim | Crank angle threshold value |
| phiTDCDevLim | Crankshaft angle threshold value |
| phiTDCOvrRunLo | Speed dependent characteristic line/curve |
| phiTDCOvrRunHi | Speed dependent characteristic line/curve |
| pmi | Indicated median pressure |
| pmiHiPressOffsCorrLim | Pressure threshold value |
| pmOvrRun | Loss pressure |
| pmOvrRunCorrLim | Torsional moment threshold value |
| pmiStdDev | Standard deviation of the indicated mean pressure |
| pmiStdDevLim | Pressure threshold value |

What is claimed is:

1. A method for diagnosing signal values in a motor vehicle, comprising the steps of:
receiving signal values by an engine control unit from cylinder pressure sensors of cylinders in a combustion engine;
deriving at least one characteristic value from an evaluation of said signal values, and
analyzing said characteristic value to determine whether the signal values of the cylinder pressure sensors are faulty, wherein when a maximal cylinder pressure gradient of each cylinder lies below a threshold value, the analysis results in that the signal values from all of the cylinder pressure sensors are faulty.

2. A method according to claim 1, wherein the threshold value lies within a range from 0.4 bar/° CA to 0.6 bar/° CA.

3. A method according to claim 1, wherein when raw signal values from the cylinder pressure sensor exceed or fall short of predefined digitization thresholds, the analysis yields the finding that the signal values from the cylinder pressure sensor are faulty.

4. A method for diagnosing signal values in a motor vehicle, comprising the steps of:
receiving signal values by an engine control unit from cylinder pressure sensors of cylinders in a combustion engine;
deriving at least one characteristic value from an evaluation of said signal values, and
analyzing said characteristic value to determine whether the signal values of the cylinder pressure sensors are faulty, wherein when the combustion engine is operated in a push mode and data are acquired for a cylinder indicating that the absolute difference between a first crankshaft angle for a maximal cylinder pressure, which is determined by interpolation of cylinder pressure values, and a second crankshaft angle for the maximal cylinder pressure is greater than a crankshaft angle threshold value, the analysis yields the finding that the signal values of the cylinder pressure sensor of the cylinder are faulty, wherein the first crankshaft angle is determined in that from at least three cylinder pressure-crankshaft angle-variate pairs, which lie around the maximal cylinder pressure, a parabola is constructed and from said parabola, the vertex is determined, wherein the second crankshaft angle is determined by a special method in which equally great cylinder pressure values in a compression phase and in an expansion phase are acquired by symmetrical aspects.

5. A method according to claim 4, wherein the crankshaft angle threshold value lies between 0.3° CA and 0.5° CA.

6. A method according to claim 4, wherein the special method determines a cylinder pressure-crankshaft angle-variate pair in a compression phase of the cylinder and, for a cylinder pressure of this cylinder pressure-crankshaft angle-variate pair, determines, from a set of cylinder pressure-crankshaft angle-variate pairs in a subsequent expansion phase of the cylinder, a cylinder pressure-crankshaft angle-variate pair, in which the appertaining cylinder pressure lies at least below the cylinder pressure, wherein the special method, in addition to the cylinder pressure-crankshaft angle-variate pair in the expansion phase determined in this manner, determines the cylinder pressure-crankshaft angle-variate pair which temporally lies before the latter, wherein by interpolation of the two cylinder pressure-crankshaft angle-variate pairs in the expansion phase that were determined in this manner, the special method determines a crankshaft angle for which there is a cylinder pressure in the expansion phase, wherein with this crankshaft angle and with a crankshaft angle appertaining to the cylinder pressure-crankshaft angle-variate pair in the compression phase, the second crankshaft angle is determined.

7. A method according to claim 6, wherein the special method determines the second crankshaft angle phipCylMaxTDC with the following formula:

$$phipCylMaxTDC = \frac{phiE1 + \frac{pCylC - pCylE1}{pCylE2 - pCylE1} \times (phiE2 - phiE1) + phiC}{2}$$

with
phipCylMaxTDC second crankshaft angle,
pCylC cylinder pressure of a selected variate pair (pCylC/phiC) under compression,
pCylE1 cylinder pressure of a variate pair (pCylE1/phiE1) under expansion, whose cylinder pressure lies at least below the cylinder pressure pCylC
pCylE2 cylinder pressure of a variate pair (pCylE2/phiE2) under expansion, which temporally lies directly before the variate pair (pCylE1/phiE1)
PhiC crankshaft angle of the variate pair (pCylC/phiC),
PhiE1 crankshaft angle of the variate pair (pCylE1/phiE1), and
PhiE2 crankshaft angle of the variate pair (pCylE2/phiE2).

8. A method according to claim 6, wherein the special method determines a predefined number of cylinder pressure-crankshaft angle-variate pairs in the compression phase, wherein the special method determines for each of these cylinder pressure-crankshaft angle-variate pairs respectively one additional second crankshaft angle and determines the second crankshaft angle from a mean value of the additional second crankshaft angles determined in this manner.

9. A method according to claim 6, wherein the cylinder pressure-crankshaft angle-variate pair or the cylinder pressure-crankshaft angle-variate pairs in the compression phase respectively exhibit a crankshaft angle which lies at least 5° CA before the top dead center.

10. A method according to claim 6, wherein the set of cylinder pressure-crankshaft angle-variate pairs in the expansion phase respectively exhibit a crankshaft angle which lies within a range from 5° CA to 150° CA after the top dead center.

11. A method for diagnosing signal values in a motor vehicle, comprising the steps of:

receiving signal values by an engine control unit from cylinder pressure sensors of cylinders in a combustion engine;

deriving at least one characteristic value from an evaluation of said signal values, and analyzing said characteristic value to determine whether the signal values of the cylinder pressure sensors are faulty, wherein when an offset correction value of a cylinder, with which the signal values of the cylinder pressure sensor are corrected to an absolute pressure level, changes by more than one pressure threshold value between two consecutive firing cycles, the analysis yields the finding that a drift in the signal values of the cylinder pressure sensor is too great.

12. A method according to claim 11, wherein the pressure threshold value ranges from between 0.7 bar and 0.9 bar.

13. A method for diagnosing signal values in a motor vehicle, comprising the steps of:

receiving signal values by an engine control unit from cylinder pressure sensors of cylinders in a combustion engine;

deriving at least one characteristic value from an evaluation of said signal values, and analyzing said characteristic value to determine whether the signal values of the cylinder pressure sensors are faulty, wherein, during normal operation of the combustion engine, the difference between a theoretical maximal pressure in a compression phase, which is determined by an intake pipe pressure, a polytropic curve exponent κ and a compression ratio, and a maximal cylinder pressure, measured by the cylinder pressure sensor, is less than a pressure threshold value, the analysis yields the finding that the cylinder pressure sensor is incorrectly calibrated or that the compression ratio is incorrect.

14. A method according to claim 13, wherein a theoretical maximal pressure in a compression phase is determined by the multiplication of an intake pipe pressure by a compression ratio potentiated by a polytropic curve exponent κ.

15. A method for diagnosing signal values in a motor vehicle, comprising the steps of:

receiving signal values by an engine control unit from cylinder pressure sensors of cylinders in a combustion engine;

deriving at least one characteristic value from an evaluation of said signal values, and analyzing said characteristic value to determine whether the signal values of the cylinder pressure sensors are faulty, wherein, when the combustion engine is operated in a push mode and data are acquired indicating that the difference between a maximal cylinder pressure, measured by the cylinder pressure sensor, and a theoretical maximal pressure in a compression phase, which is determined by an intake pipe pressure, a polytropic curve exponent κ and a compression ratio, is greater than a pressure threshold value, the analysis yields the finding that the cylinder pressure sensor is incorrectly calibrated or that the compression ratio is incorrectly specified.

16. A method for diagnosing signal values in a motor vehicle, comprising the steps of:

receiving signal values by an engine control unit from cylinder pressure sensors of cylinders in a combustion engine;

deriving at least one characteristic value from an evaluation of said signal values, and analyzing said characteristic value to determine whether the signal values of the cylinder pressure sensors are faulty, wherein when the combustion engine is running at idle and no gear is engaged and no power loads are being exerted on the combustion engine and data are acquired indicating that the difference between an actual indicated mean pressure and a loss mean pressure is greater than a mean pressure threshold value, the analysis yields the finding that a faulty effective moment of couple is determined.

17. A method according to claim 16, wherein the mean pressure threshold value lies between 0.4 bar and 0.6 bar.

18. A method for diagnosing signal values in a motor vehicle, comprising the steps of:

receiving signal values by an engine control unit from cylinder pressure sensors of cylinders in a combustion engine;

deriving at least one characteristic value from an evaluation of said signal values, and analyzing said characteristic value to determine whether the signal values of the cylinder pressure sensors are faulty, wherein when the combustion engine is operated in push mode and is running at a specific speed and data are acquired indicating that a mean pressure is greater than a mean pressure threshold value, the analysis yields the finding that a top dead center is incorrectly specified and/or that the cylinder pressure sensor is not calibrated properly and/or that the cylinder pressure sensor is not working in a linear mode and/or that the cylinder pressure sensor is not suited to a cylinder to which it is assigned.

19. A method according to claim 18, wherein the specified speed for a Diesel engine lies within a range of 1,500 to 2,500 revolutions per minute.

20. A method for diagnosing signal values in a motor vehicle, comprising the steps of:

receiving signal values by an engine control unit from cylinder pressure sensors of cylinders in a combustion engine;

deriving at least one characteristic value from an evaluation of said signal values, and analyzing said characteristic value to determine whether the signal values of the cylinder pressure sensors are faulty, wherein when the combustion engine is in a phase of steady state torque demand and data are acquired indicating that a standard deviation of an indicated mean pressure is greater than a mean pressure threshold value, the analysis yields the finding that a control of a cylinder is unstable and/or that the evaluation of the cylinder pressure sensor is unstable.

21. A method according to claim 20, wherein a mean pressure threshold value lies within a range between 0.6 bar and 0.8 bar.

22. A method for diagnosing signal values in a motor vehicle, comprising the steps of:

receiving signal values by an engine control unit from cylinder pressure sensors of cylinders in a combustion engine;

deriving at least one characteristic value from an evaluation of said signal values, and analyzing said characteristic value to determine whether the signal values of the cylinder pressure sensors are faulty, wherein when the combustion engine is in a phase of steady state torque demand and data are acquired indicating that a standard deviation in combustion positions is greater than a crankshaft angle threshold value, the analysis yields the finding that a control of a cylinder is unstable and/or that the evaluation of the cylinder pressure sensor is unstable.

23. A method according to claim 22, wherein a crankshaft angle threshold value lies within a range from 0.6° CA to 0.8° CA.

24. A method for diagnosing signal values in a motor vehicle, comprising the steps of:
receiving signal values by an engine control unit from cylinder pressure sensors of cylinders in a combustion engine;
deriving at least one characteristic value from an evaluation of said signal values, and
analyzing said characteristic value to determine whether the signal values of the cylinder pressure sensors are faulty, wherein when the combustion engine is operated in push mode and data are acquired for one of the cylinders indicating that a crankshaft angle for a maximal cylinder pressure does not lie within a crankshaft angle range that is about a loss angle before a top dead center, the analysis yields the finding that the signal values from the cylinder pressure sensor are faulty.

25. A method according to claim 24, wherein the loss angle is dependent on a speed and is determined in advance in that the crankshaft angle for the maximal cylinder pressure is acquired for all speeds during push mode when the combustion engine is operatively warmed up, wherein the combustion engine is set in advance in such a manner that at 2,000 revolutions per minute, the crankshaft angle for the maximal cylinder pressure at 0.7° CA lies before the top dead center.

26. A method according to claim 24, wherein the crankshaft angle range begins 1° CA before the loss angle and ends 1° CA after the loss angle.

* * * * *